United States Patent
Tokunaga (10) Patent No.: US 9,347,566 B2
(45) Date of Patent: May 24, 2016

(54) SLIDING COMPONENT (71) Applicant: EAGLE INDUSTRY CO., LTD., Minato-ku, Tokyo (JP)

(72) Inventor: Yuichiro Tokunaga, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/407,435

(22) PCT Filed: Oct. 10, 2013

(86) PCT No.: PCT/JP2013/077579
§ 371 (c)(1),
(2) Date: Dec. 11, 2014

(87) PCT Pub. No.: WO2014/061544
PCT Pub. Date: Apr. 24, 2014

(65) Prior Publication Data
US 2015/0167847 A1  Jun. 18, 2015

(30) Foreign Application Priority Data

Oct. 18, 2012 (JP) ................. 2012-230607

(51) Int. Cl.
*F16J 15/34* (2006.01)

(52) U.S. Cl.
CPC ............ *F16J 15/3412* (2013.01); *F16J 15/348* (2013.01); *F16J 15/3448* (2013.01)

(58) Field of Classification Search
CPC ..... F16J 15/34; F16J 15/3404; F16J 15/3408; F16J 15/3412; F16J 15/3424
See application file for complete search history.

(56) References Cited

U.S. PATENT DOCUMENTS

| 5,090,712 A * | 2/1992 | Pecht et al. .................. 277/400 |
| 5,492,341 A * | 2/1996 | Pecht et al. .................. 277/400 |
| 5,501,470 A * | 3/1996 | Fuse et al. .................... 277/400 |
| 6,189,896 B1 | 2/2001 | Dickey et al. |
| 2002/0093141 A1* | 7/2002 | Wang .......................... 277/358 |
| 2005/0212217 A1 | 9/2005 | Tejima |

(Continued)

FOREIGN PATENT DOCUMENTS

| CN | 1059195 A | 3/1992 |
| JP | H08-277941 A | 10/1996 |
| JP | 2000-310336 A | 11/2000 |

(Continued)

OTHER PUBLICATIONS

International Search Report (ISR) mailed Nov. 12, 2013, issued for International application No. PCT/JP2013/077579.

(Continued)

*Primary Examiner* — Gilbert Lee
(74) *Attorney, Agent, or Firm* — Law Office of Katsuhiro Arai

(57) ABSTRACT

A sliding component is characterized in that dimples are provided on one sealing face of a pair of sliding parts that mutually slide relative to each other, and stripe-shaped projections with directionality are provided in a cavitation formation area in each dimple. The sliding component can prevent leakage regardless of the level of differential pressure between the inner periphery and outer periphery of the sealing face by controlling the streak-like flow of fluid due to cavitation that occurs in a dimple or other concaved part formed on the sealing face.

6 Claims, 8 Drawing Sheets

(56) References Cited

U.S. PATENT DOCUMENTS

2012/0217705 A1* 8/2012 Hosoe et al. .................. 277/400
2014/0353925 A1 12/2014 Oshima et al.

FOREIGN PATENT DOCUMENTS

| | | |
|---|---|---|
| JP | 2005-180652 A | 7/2005 |
| WO | 2013/121812 A1 | 8/2013 |
| WO | 2013/121813 A1 | 8/2013 |

OTHER PUBLICATIONS

First Notification of Reason for Refusal with Search Report issued by the State Intellectual Property Office of China on Oct. 23, 2015 for Chinese counterpart application No. 201380031330.0.

* cited by examiner

SLIDING COMPONENT

This application is the U.S. National Phase under 35 U.S.C. §371 of International Application PCT/JP2013/077579 filed Oct. 10, 2013, which claims priority to Japanese Patent Application No. 2012-230607, filed Oct. 18, 2012. The International Application was published under PCT Article 21(2) in a language other than English.

TECHNICAL FIELD

The present invention relates to a sliding component suitable for mechanical seals, bearings, and other sliding mechanisms, for example. In particular, the present invention relates to a sliding component for seal rings, bearings, etc., that must reduce friction by retaining a fluid on the sealing face and also prevent the fluid from leaking out of the sealing face.

BACKGROUND ART

For a mechanical seal, which is an example of a sliding component, to maintain sealing property for a long period of time, it must satisfy the mutually exclusive conditions of "seal" and "lubricate." Particularly in recent years, the demand for lower friction is increasing further in the area of environmental protection, etc., as a means to prevent the sealed fluid from leaking while reducing mechanical loss at the same time. One way to reduce friction is to generate dynamic pressure between the sealing faces by means of rotation to create the so-called hydrodynamic lubrication state where the surfaces slide against each other with a liquid film in between. In this case, however, positive pressure generates between the sealing faces and the fluid flows out of the sealing faces from the part subject to the positive pressure. This is the so-called side leakage that occurs with bearings and corresponds to how seals leak.

In the case of liquid sealing, where the viscosity of the liquid is greater than that of gas, the dynamic pressure effect is achieved between the two surfaces due to their minute undulations and surface irregularities that are present even when both are planes. Accordingly, liquid sealing structures are often designed to give priority to sealing performance. On the other hand, however, several mechanisms have been contrived to demonstrate the pumping effect of pulling back the leaked liquid to the high-pressure side in order to seal and lubricate at the same time. For example, Patent Literature 1 discloses an invention which is a rotary ring having several spiral grooves on its shaft seal area in the circumferential direction so as to move the fluid toward the high-pressure chamber.

Also among other inventions relating to a sliding component, one invention is known where a suction means is formed on the sealed-fluid side of the sealing faces in order to introduce the sealed fluid to the sealing faces, and the sealed fluid thus introduced is stored in two dimples formed on the outer periphery side and inner periphery side of the sealing faces in a radial direction and separated by a dam, while being pumped in the dimple on the inner periphery side in a radial direction, so as to prevent leakage of the sealed fluid from the seal area positioned on the inner periphery side of the two dimples in a radial direction (refer to Patent Literature 2).

However, the inventions described in Patent Literatures 1 and 2 above are subject to a pressure difference between the inner periphery and outer periphery of the seal or other sealing faces, thus requiring a pumping action to counter the pressure and potentially are unable to push back the fluid, depending on the level of this pressure. This creates the problem of more fluid leaking when the pressure difference is large, although leakage can be prevented when the pressure difference is small.

PRIOR ART LITERATURES

Patent Literatures

Patent Literature 1: Japanese Patent Laid-open No. Hei 8-277941 (Page 5, FIG. 6)
Patent Literature 2: Japanese Patent Laid-open No. 2005-180652

SUMMARY OF INVENTION

Problems to be Solved by Invention

When the sealing faces of two parts are each constituted by a smooth surface, as is the case of a general mechanical seal, not only the sealed fluid forms a film between the sealing faces, but it is known that cavitation occurring in the fluid also forms a phase between them (refer to ASME Paper No. 65-Lub-11 by Hamilton, Walowit and Allen (1965)). In other words, a phase constituted by liquid (sealed liquid) (hereinafter referred to as "liquid phase") and another phase constituted by gas (hereinafter referred to as "gas phase") are formed between the sealing faces.

Figure 1:
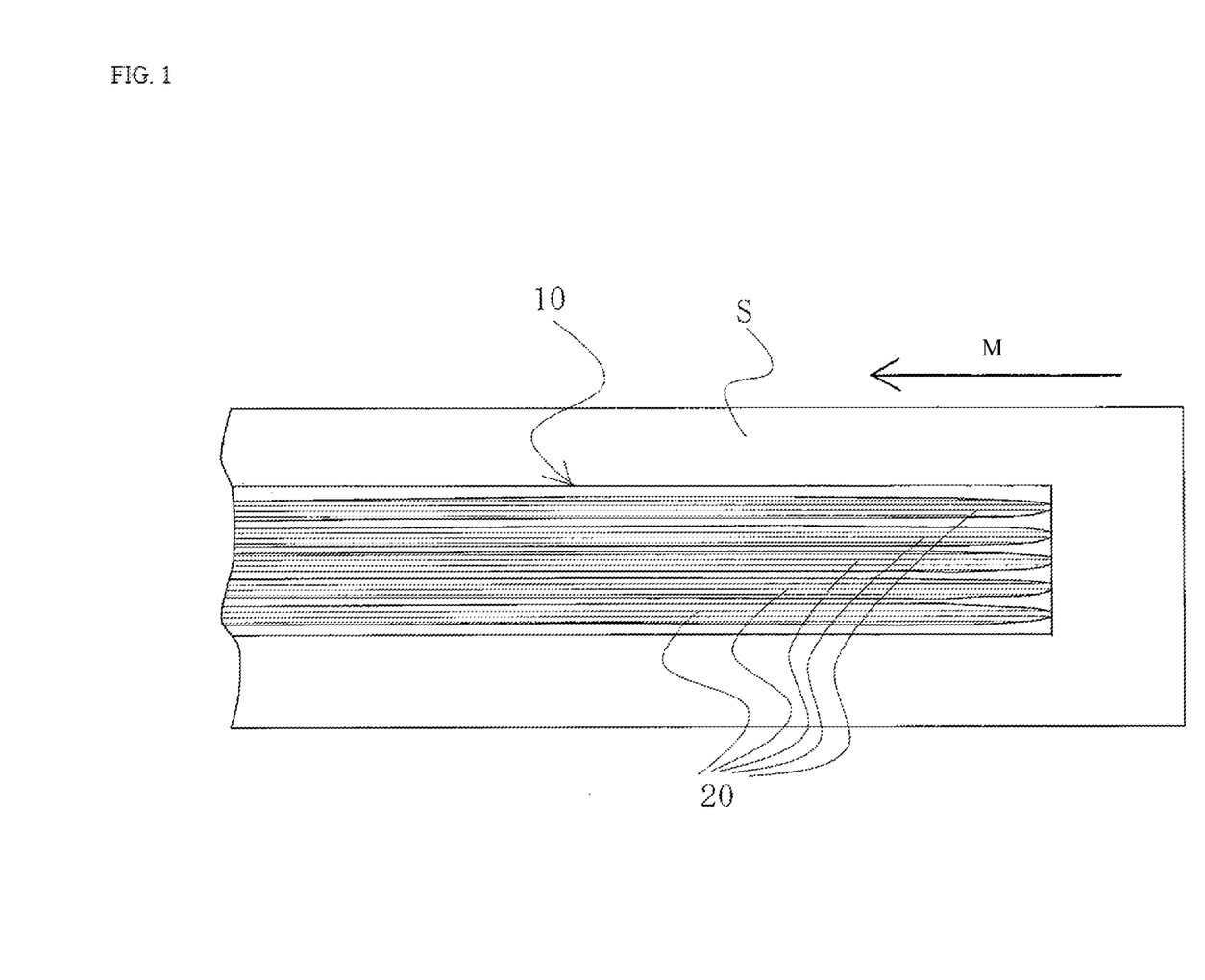
FIG. 1 is a drawing explaining the streak-like flow of fluid due to cavitation that generates in a dimple formed on the sealing face.

Also, as shown in FIG. 1, it is generally known that a streak-like flow of fluid 20 due to cavitation generates in a dimple or other concaved part 10 formed on the sealing face S ("M" in FIG. 1 refers to the moving direction of mating sealing face).

An object of the present invention is to provide a sliding component that can prevent leakage regardless of the level of differential pressure between the inner periphery and outer periphery of the sealing face by controlling the streak-like flow of fluid due to cavitation that occurs in a dimple or other concaved part (referred to as "dimple" in this Specification) formed on the sealing face.

Means to Solve Problems

Principles

Figure 2:
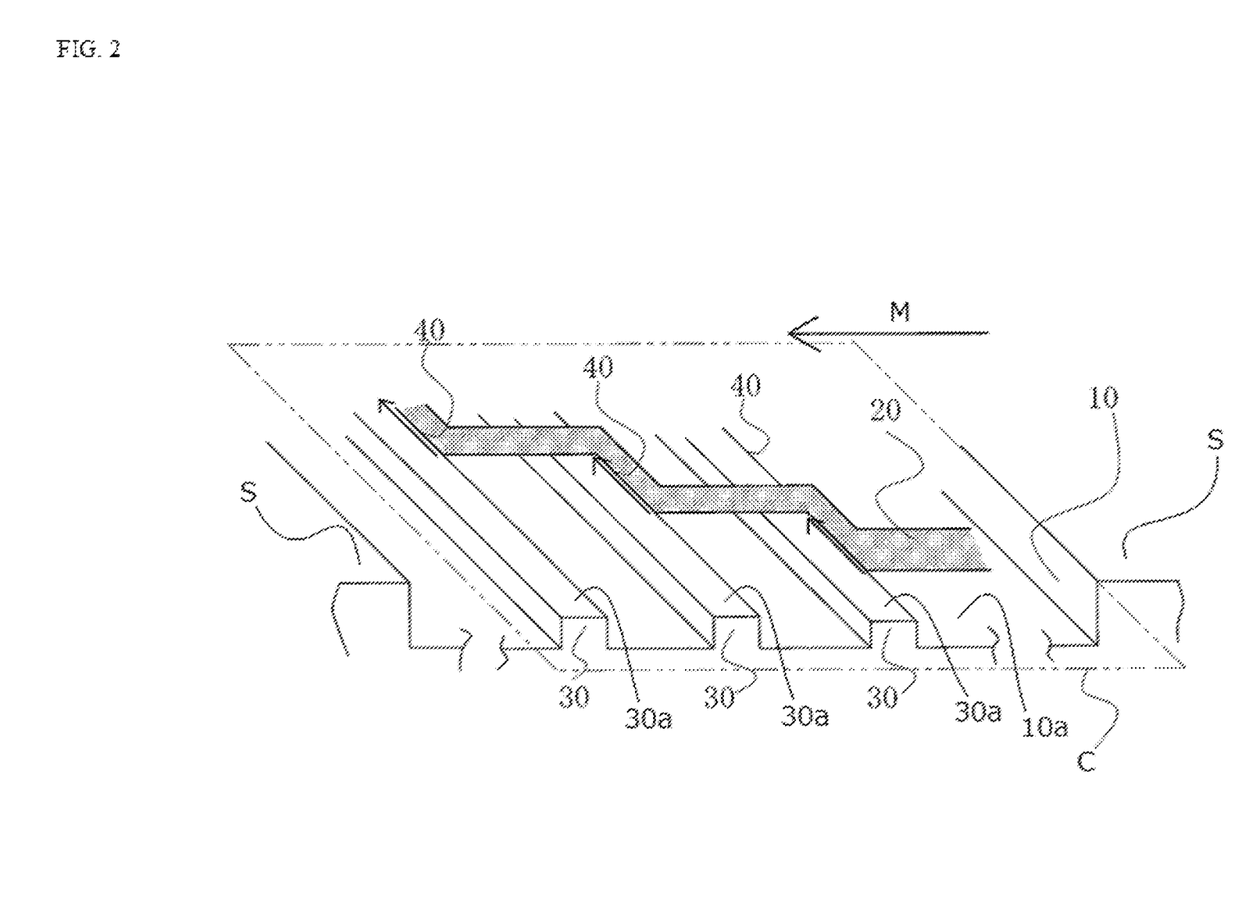
FIG. 2 is a drawing explaining how the direction of the streak-like flow of fluid in the cavitation area that generates in a dimple formed on the sealing face is changed when stripe-shaped projections with directionality are provided at the bottom of the dimple.

The inventors of the present invention gained the knowledge, during the course of research on fluid lubrication action in a dimple on the sealing face of a mechanical seal, etc., that, when stripe-shaped projections 30 with directionality are provided at the bottom of a dimple formed on the sealing face, as shown in FIG. 2, the direction of a streak-like flow of fluid 20 that generates in the area of cavitation "C" occurring in the dimple 10 can be changed or controlled. This is probably explained by the fact that the cavitation is internally filled with gas whose viscosity is sufficiently low compared to that of liquid, and the resulting good fluidity keeps the pressure in the cavitation constant, which in turn acts to control the streak-like flow in the cavitation regardless of the differential pressure between the inner periphery and outer periphery of the sealing face.

In other words, when the stripe-shaped projections 30 with directionality are present at the bottom 10a of the dimple 10, edges 40 of the stripe-shaped projections 30 act upon the gas-liquid interface as geometrical barriers to prevent the movement of the streak-like flow of fluid 20 from passing over top faces 30a of the stripe-shaped projections 30, and as a result, the streak-like flow of fluid 20 moves to a certain degree along the edges 40 of the stripe-shaped projections 30 and consequently the streak-like flow inside the cavitation is controlled (the height relationship between top faces 30a of the stripe-shaped projections 30, the sealing face S, and the bottom 10a of the dimple 10 is shown in FIG. 2).

Means

To achieve the aforementioned object, firstly the sliding component proposed by the present invention is characterized in that dimples are provided on one sealing face of a pair of sliding parts that mutually slide relative to each other, and stripe-shaped projections with directionality are provided in a cavitation formation area in each dimple.

According to these characteristics, the streak-like flow of fluid that generates in the dimple due to cavitation can be controlled and thus leakage can be prevented regardless of the level of differential pressure between the inner periphery and outer periphery of the sealing face. To describe this in detail, the cavitation is internally filled with gas whose viscosity is sufficiently low compared to that of liquid, and the resulting good fluidity keeps the pressure in the cavitation constant, which in turn acts to control the streak-like flow in the cavitation regardless of the differential pressure between the inner periphery and outer periphery of the sealing face, and if stripe-shaped projections with directionality are present in the dimple, edges of the projections act upon the gas-liquid interface as geometrical barriers to prevent the movement of the streak-like flow of fluid from passing over the projections, and as a result, the streak-like flow of fluid moves to a certain degree along the edges of the projections and consequently the streak-like flow inside the cavitation is controlled and leakage is prevented.

Furthermore, secondly, the sliding component proposed by the present invention is characterized, in addition to the first characteristics, in that the stripe-shaped projections with directionality are provided at least on the low-pressure fluid side of the cavitation formation area.

According to these characteristics, the control of the streak-like flow of fluid by the stripe-shaped projections with directionality is implemented at least on the low-pressure fluid side of the dimple, which prevents leakage to the low-pressure fluid side.

Furthermore, thirdly, the sliding component proposed by the present invention is characterized, in addition to the first or second characteristics, in that continuous grooves that continue to the high-pressure fluid side are provided at least in a location other than the cavitation formation area in the dimple.

According to these characteristics, the positive pressure on the downstream of the dimple is released, which in turn reduces the upstream pressure and makes it easier for cavitation to occur on the upstream side, and consequently the cavitation formation area extends to near the downstream side of the dimple and the direction of the streak-like flow of fluid caused by the cavitation formation area can be controlled much better as a result. In addition, fluid that has flowed into the positive pressure area can be returned to the high-pressure fluid side.

Furthermore, fourthly, the sliding component proposed by the present invention is characterized, in addition to the first or second characteristics, in that the stripe-shaped projections with directionality provided in the cavitation formation area in the dimple are formed in such a way that their directions become symmetrical with respect to the sliding direction of the sealing face, relative to the center of the dimple in the sliding direction.

According to these characteristics, the sliding parts need not be replaced regardless of whether the rotating direction of the mating sealing face is forward or reverse.

Effects of Invention

The present invention offers excellent effects as described below:

(1) Dimples are provided on one sealing face of a pair of sliding parts that mutually slide relative to each other, and stripe-shaped projections with directionality are provided in a cavitation formation area in each dimple, as a result of which the streak-like flow of fluid that generates in the dimple due to cavitation can be controlled, which in turn prevents leakage regardless of the level of differential pressure between the inner periphery and outer periphery of the sealing face.

(2) Stripe-shaped projections with directionality are provided at least on the low-pressure fluid side of the cavitation formation area, as a result of which the control of the streak-like flow of fluid by the projections is implemented at least on the low-pressure fluid side of the dimple, which in turn prevents leakage to the low-pressure fluid side.

(3) Continuous grooves that continue to the high-pressure fluid side are provided at least in a location other than the cavitation formation area in the dimple, as a result of which the positive pressure on the downstream of the dimple is released, which in turn reduces the upstream pressure and makes it easier for cavitation to occur on the upstream side, and consequently the cavitation formation area extends to near the downstream side of the dimple and the direction of the streak-like flow of fluid caused by the cavitation formation area can be controlled much better as a result. In addition, fluid that has flowed into the positive pressure area can be returned to the high-pressure fluid side.

(4) Stripe-shaped projections with directionality provided in the cavitation formation area in the dimple are formed in such a way that their directions become symmetrical with respect to the sliding direction of the sealing face, relative to the center of the dimple in the sliding direction, as a result of which the sliding parts need not be replaced regardless of whether the rotating direction of the mating sealing face is forward or reverse.

BRIEF DESCRIPTION OF DRAWINGS

FIG. 5(a) is a drawing explaining a positive-pressure generation mechanism constituted by a wedge action at a narrowing gap (step) on the downstream side of a dimple, while (b) is a drawing explaining a negative-pressure generation mechanism constituted by a reversed wedge action at an expanding gap (step) on the upstream side of a dimple.

MODES FOR CARRYING OUT THE INVENTION

Modes for carrying out the present invention are explained below based on examples. It should be noted, however, that, unless otherwise specified expressly, the dimensions, materials, shapes and relative arrangements, among others, of the components described in these examples do not intend to limit the scope of the present invention to these dimensions, materials, shapes, and relative arrangements, etc.

Example 1

The sliding component pertaining to Example 1 of the present invention is explained by referring to FIGS. 3 to 6.

It should be noted that, in this example, the sliding component represents a part that constitutes a mechanical seal.

Figure 3:
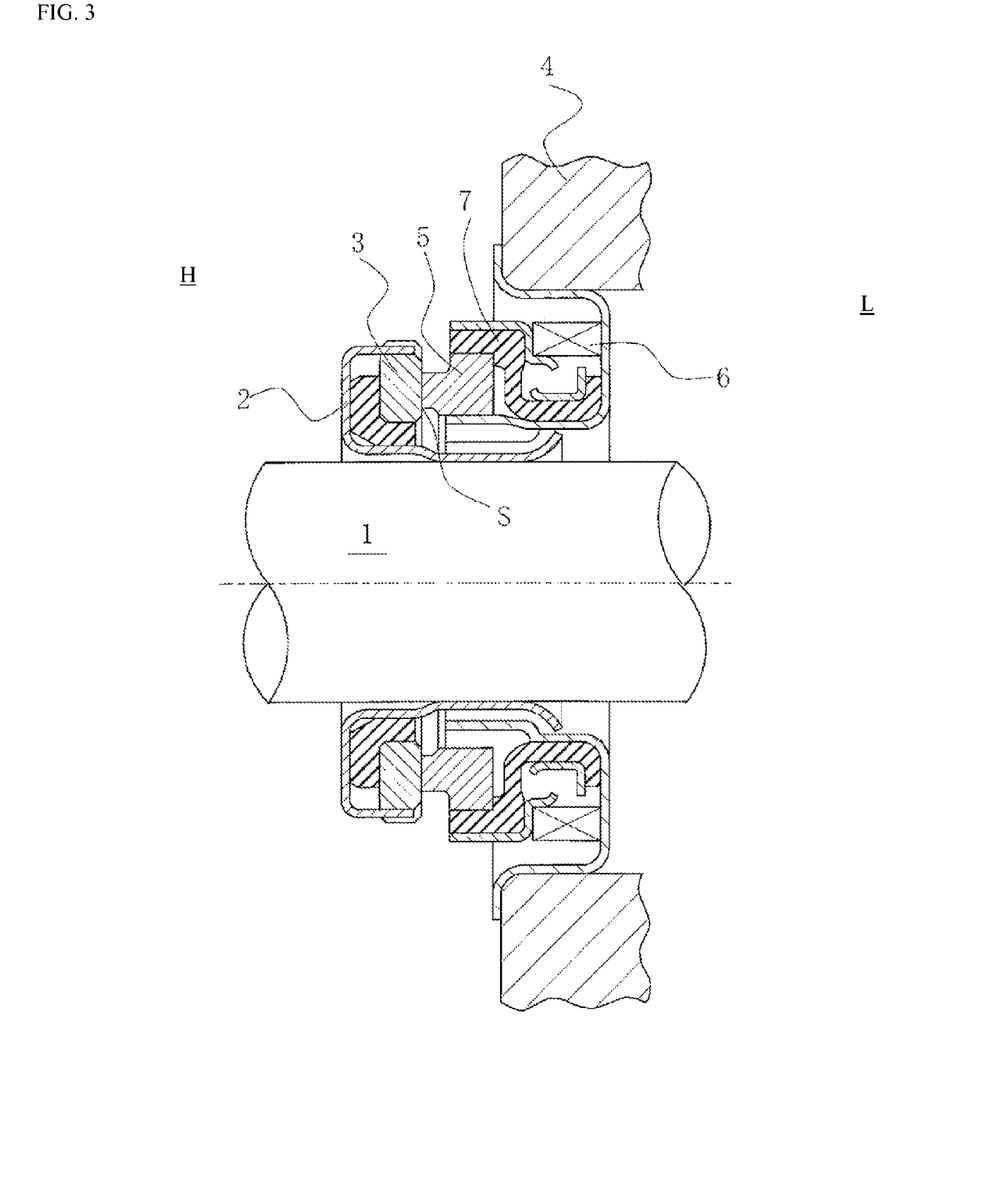
FIG. 3 is a longitudinal section view showing an example of mechanical seal that pertains to an example of the present invention.

FIG. 3 is a longitudinal section view showing an example of a mechanical seal, where the mechanical seal is of the inside type that seals the fluid on the high-pressure fluid side "H" that tries to flow in the direction from the outer periphery to inner periphery of the sealing face, comprising: an annular rotating ring 3 provided, on a rotational axis 1 that drives a pump impeller (not illustrated) on the high-pressure fluid side "H", via a sleeve 2 in a manner rotatable integrally with the rotational axis 1; and an annular stationary ring 5 provided on a housing 4 of the pump in a manner not rotatable but movable in the axial direction; with the two rings sliding relatively in a manner contacting each other via their sealing faces S that have been mirror-surface-finished by lapping, etc., by means of a coiled wave spring 6 and bellows 7 biasing the stationary ring 5 in the axial direction. In other words, this mechanical seal prevents outflow of the sealed fluid toward the atmosphere side "L" from the outer periphery of the rotational axis 1, using the sealing faces S of the rotating ring 3 and stationary ring 5.

Figure 4:
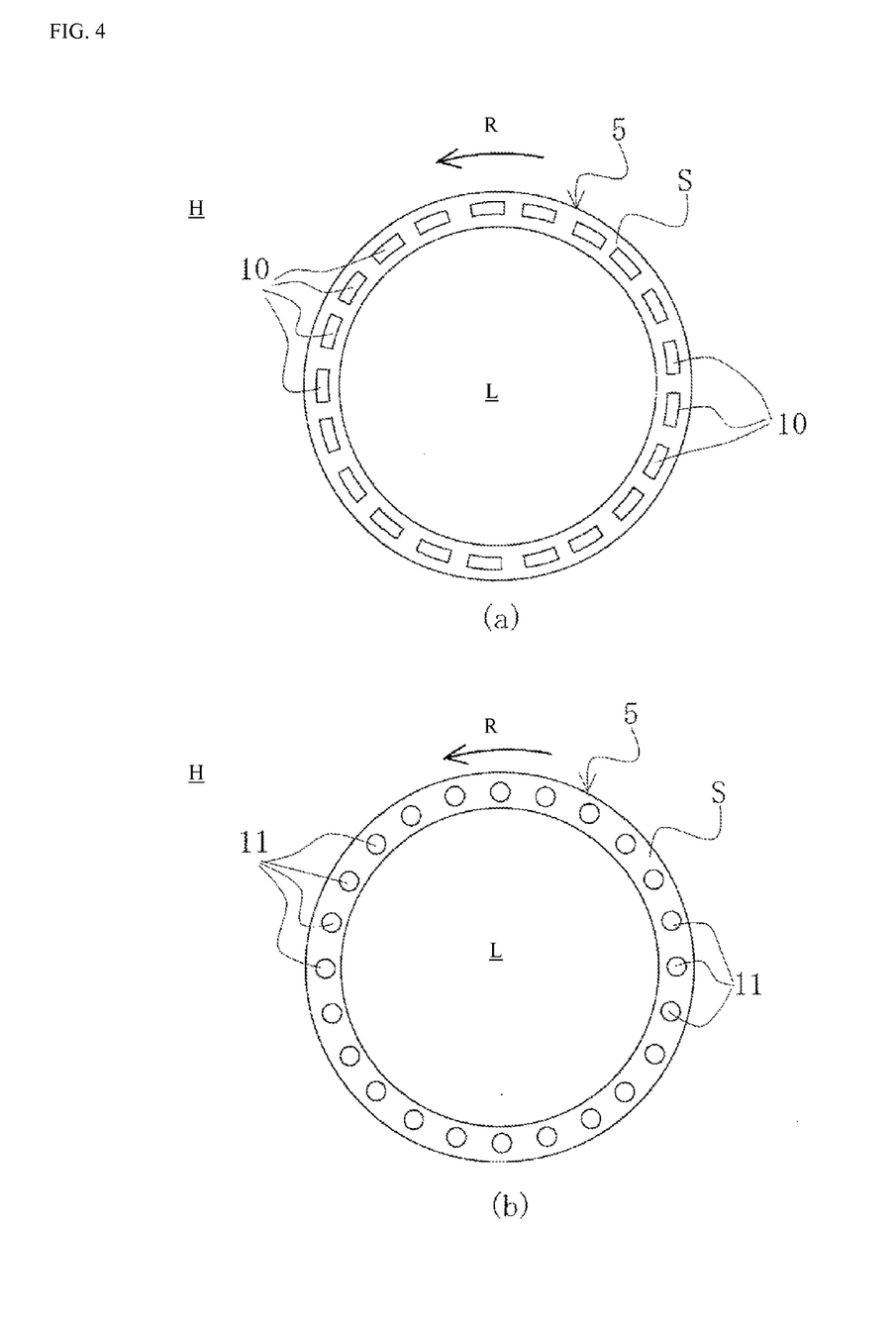
FIG. 4 shows sealing faces of sliding parts pertaining to Example 1 of the present invention, where the dimple has a quadrilateral shape in (a), while it has a circular shape in (b).

FIG. 4 shows the sealing faces of a sliding component pertaining to Example 1 of the present invention, explaining examples where a dimple is formed on the sealing face of the stationary ring 5 in FIG. 3.

In FIG. 4 (a), multiple quadrilateral dimples 10 are provided on the sealing face S in the circumferential direction. The dimples 10 do not continue to the high-pressure fluid side "H" or low-pressure fluid side "L", and the respective dimples 10 are provided independent of one another. The number of dimples 10 and their area and depth are set to optimal values according to the diameter and surface width of the stationary ring 5, differential pressure between the high-pressure fluid side "H" and low-pressure fluid side "L", and other conditions, but preferably the dimples have a large area and shallow depth from the viewpoints of hydrodynamic lubrication action and formation of liquid film.

Note that in FIG. 4 (a), the dimples 10 are shaped in such a way that their two sides, namely the inner circumference side and outer circumference side, form arcs whose center corresponds to the center of the stationary ring 5, with the remaining two sides in the radical direction, namely the upstream side and downstream side, being comprised of straight lines; however, they can have any other shape such as rectangle, square or polygon.

In FIG. 4 (b), multiple dimples 11 having a circular shape are provided in the circumferential direction. Just like in FIG. 4 (a), the dimples 11 do not continue to the high-pressure fluid side "H" or low-pressure fluid side "L" and the respective dimples 11 are provided independent of one another. Preferably the dimples 11 have a large diameter and are shallow, but because the size and depth of dimples 11 vary depending on the viscosity of the fluid as well as its actuation speed and film pressure and must thus be designed in consideration of various conditions in a comprehensive manner, it is difficult to determine the dimple size and depth in uniform ways.

Figure 5:
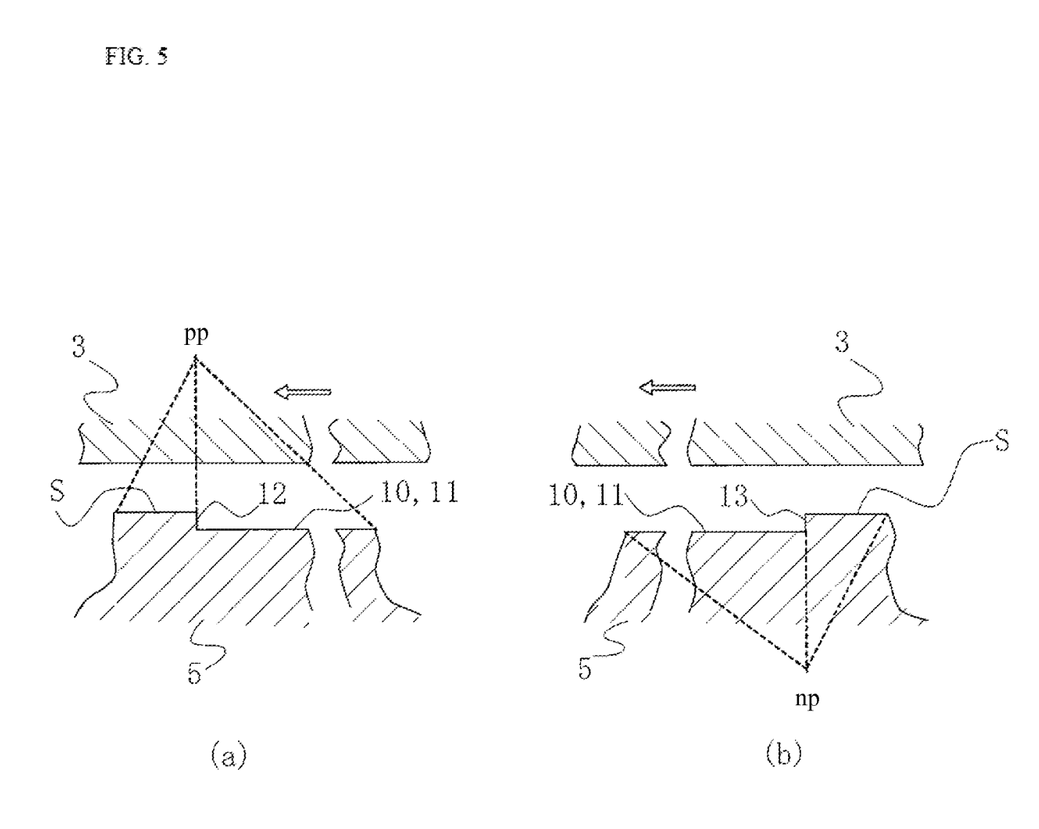

Now, the positive-pressure generation mechanism and negative-pressure generation mechanism are explained by referring to FIG. 5 under the assumption that dimples conforming to the present invention are provided.

In FIG. 5 (a), the rotating ring 3 moves in a rotational manner relative to the stationary ring 5 in the counterclockwise direction, as shown by the arrow, but if dimples 10, 11 are formed on the sealing face S of the stationary ring 5, a narrowing gap (step) 12 exists on the downstream side of each of the dimples 10, 11. The sealing face of the mating rotating ring 3 is flat.

As the rotating ring 3 moves relatively in the direction shown by the arrow, the fluid present between the sealing faces of the rotating ring 3 and stationary ring 5 attempts, because of its viscous property, to follow the rotating ring 3 by moving in the moving direction of the rotating ring 3, and when this occurs, positive hydrodynamic pressure "pp" shown by the broken line generates due to the presence of the narrowing gap (step) 12.

In FIG. 5 (b), the rotating ring 3 moves in a rotational manner relative to the stationary ring 5 in the counterclockwise direction, as shown by the arrow, but when dimples 10, 11 are formed on the sealing face S of the stationary ring 5, an expanding gap (step) 13 exists on the upstream side of each of the dimples 10, 11. The sealing face of the mating rotating ring 3 is flat.

As the rotating ring 3 moves relatively in the direction shown by the arrow, the fluid present between the sealing faces of the rotating ring 3 and stationary ring 5 attempts, because of its viscous property, to follow the rotating ring 3 by moving in the moving direction of the rotating ring 3, and when this occurs, negative hydrodynamic pressure "np" shown by the broken line generates due to the presence of the expanding gap (step) 13.

Accordingly, negative pressure generates on the upstream side of the dimples 10, 11, while positive pressure generates on the downstream side, and cavitation occurs in the negative-pressure generation area on the upstream side.

Figure 6:
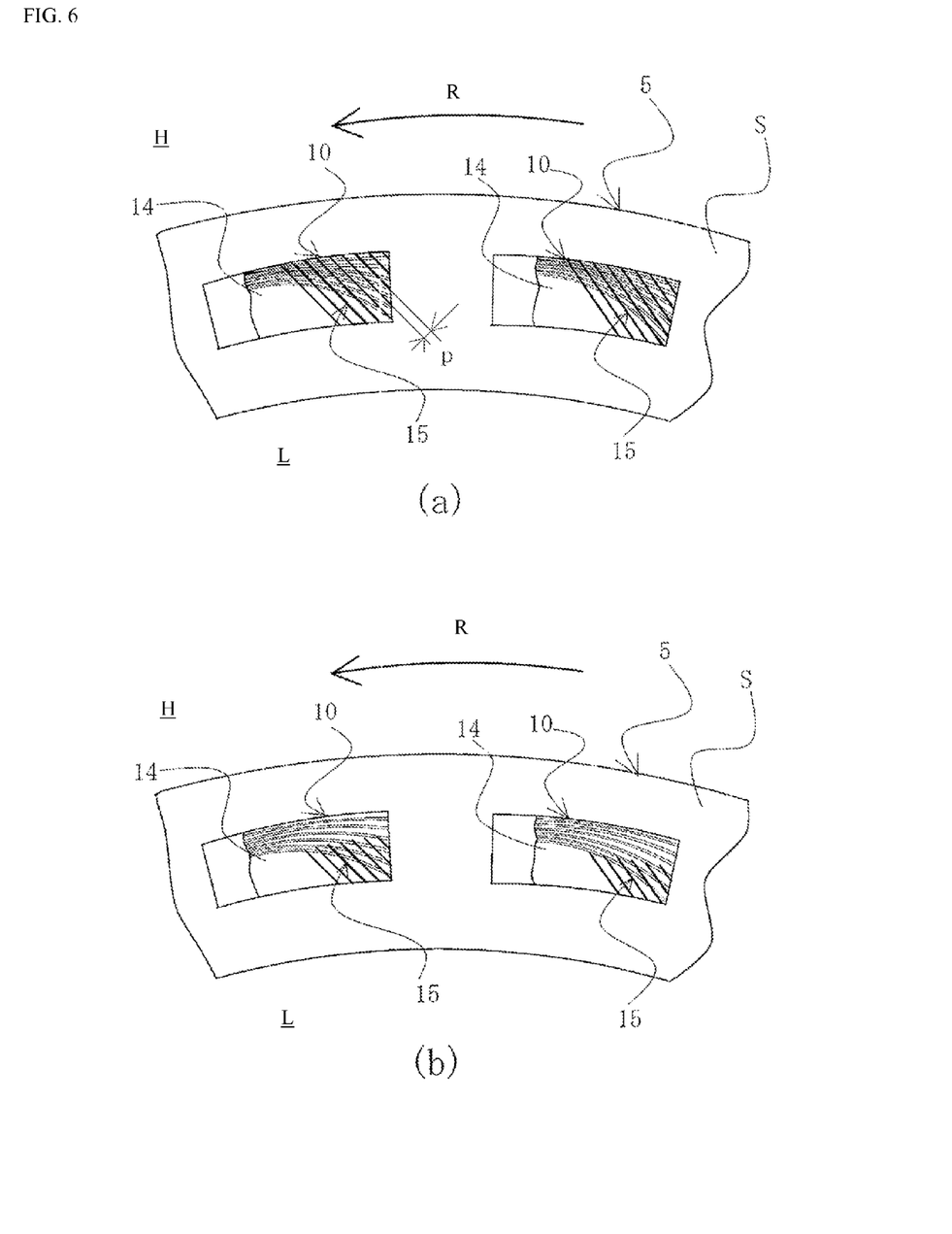
FIG. 6 is a plan view of key areas showing an example where stripe-shaped projections with directionality are provided at the bottom of the cavitation formation area in the dimple, as it pertains to Example 1 of the present invention.

FIG. 6 is a plan view of key areas showing an example where stripe-shaped projections with directionality are provided at the bottom of the cavitation formation area in the dimple.

The sealing face S of the stationary ring 5 has multiple quadrilateral dimples 10 provided on it in the circumferential direction, where the dimples 10 do not continue to the high-pressure fluid side "H" or low-pressure fluid side "L" and the respective dimples 10 are provided independent of one another.

As the sealing face of the mating side (sealing face of the rotating ring 3) moves in a rotational manner relative to the stationary ring 5 in the counterclockwise direction "R", cavitation occurs on the upstream side of the dimple 10 and a cavitation area denoted by 14 is formed (hereinafter referred to as "cavitation formation area 14"). Also, stripe-shaped projections 15 with directionality are provided in the cavitation formation area 14 in the dimple 10. The stripe-shaped projections 15 with directionality may be provided over the entire cavitation formation area 14 or in some parts thereof. Furthermore, the stripe-shaped projections 15 with directionality are formed at the bottom of the dimple 10 and their width and height are not specifically limited, so long as the edges of the stripe-shaped projections 15 with directionality act upon the gas-liquid interface as geometrical barriers to prevent the movement of the streak-like flow of fluid from passing over the stripe-shaped projections 15 with directionality, as explained in the earlier section of "Means for Solving the Problems {Principles}".

In addition, the directionality of stripe-shaped projections 15 is determined by how the fluid should be controlled and, in FIG. 6, they are inclined in the counterclockwise direction "R" from the inner diameter side toward the outer diameter side so as to push back the fluid in the dimple 10 to the high-pressure fluid side "H" and thereby prevent it from leaking to the low-pressure fluid side "L". As explained earlier, the cavitation is internally filled with gas whose viscosity is sufficiently low compared to that of liquid, and the resulting good fluidity keeps the pressure in the cavitation constant, which in turn acts to control the streak-like flow regardless of the differential pressure between the inner periphery and outer periphery of the sealing face S, and therefore when the stripe-shaped projections 15 have the directionality as shown in FIG. 6, the stripe-shaped projections 15 provided in the cavitation formation area 14 cause the streak-like flow of fluid in the dimple 10 to move to a certain degree along the edges of the first stripe-shaped projections 15 on the upstream side, and then move to a certain degree along the edges of the second stripe-shaped projections 15, and as this is repeated in succession, the fluid is controlled in a manner pushed back to the high-pressure fluid side "H" as shown by the double lines.

It should be noted that the pitch p of the stripe-shaped projections 15 with directionality only needs to be set to an optimal value from design viewpoints and is not limited in any way.

While the stripe-shaped projections 15 with directionality shown in FIG. 6 (a) are provided over the entire area of the cavitation formation area 14 in the dimple 10 from the low-pressure fluid side "L" to high-pressure fluid side "H" in a radial direction, those shown in FIG. 6 (b) are provided only on the low-pressure fluid side. In FIG. 6 (a), the control of the streak-like flow of fluid by the stripe-shaped projections 15 with directionality is implemented over the entire area from the low-pressure fluid side "L" to high-pressure fluid side "H" of the dimple 10 in the diameter direction, while in FIG. 6 (b), the control of the streak-like flow of fluid by the stripe-shaped projections 15 with directionality is implemented on the low-pressure fluid side "L" of the dimple 10. When the differential pressure between the low-pressure fluid side "L" and high-pressure fluid side "H" is large, preferably the stripe-shaped projections 15 with directionality are provided over the entire area from the low-pressure fluid side "L" to high-pressure fluid side "H" in a radial direction, as shown in FIG. 6 (a), but when the differential pressure between the low-pressure fluid side "L" and high-pressure fluid side "H" is small, leakage is prevented even if the stripe-shaped projections 15 with directionality are provided only on the low-pressure fluid side "L", as shown in FIG. 6(b).

It should be noted that, besides only on the low-pressure fluid side "L", the stripe-shaped projections 15 with directionality may be provided only on the high-pressure fluid side "H" or only at the center in the diameter direction, which means that, in essence, the area or areas where the stripe-shaped projections 15 with directionality are to be provided can be selected as deemed appropriate according to the level of differential pressure, etc.

Example 2

Figure 7:
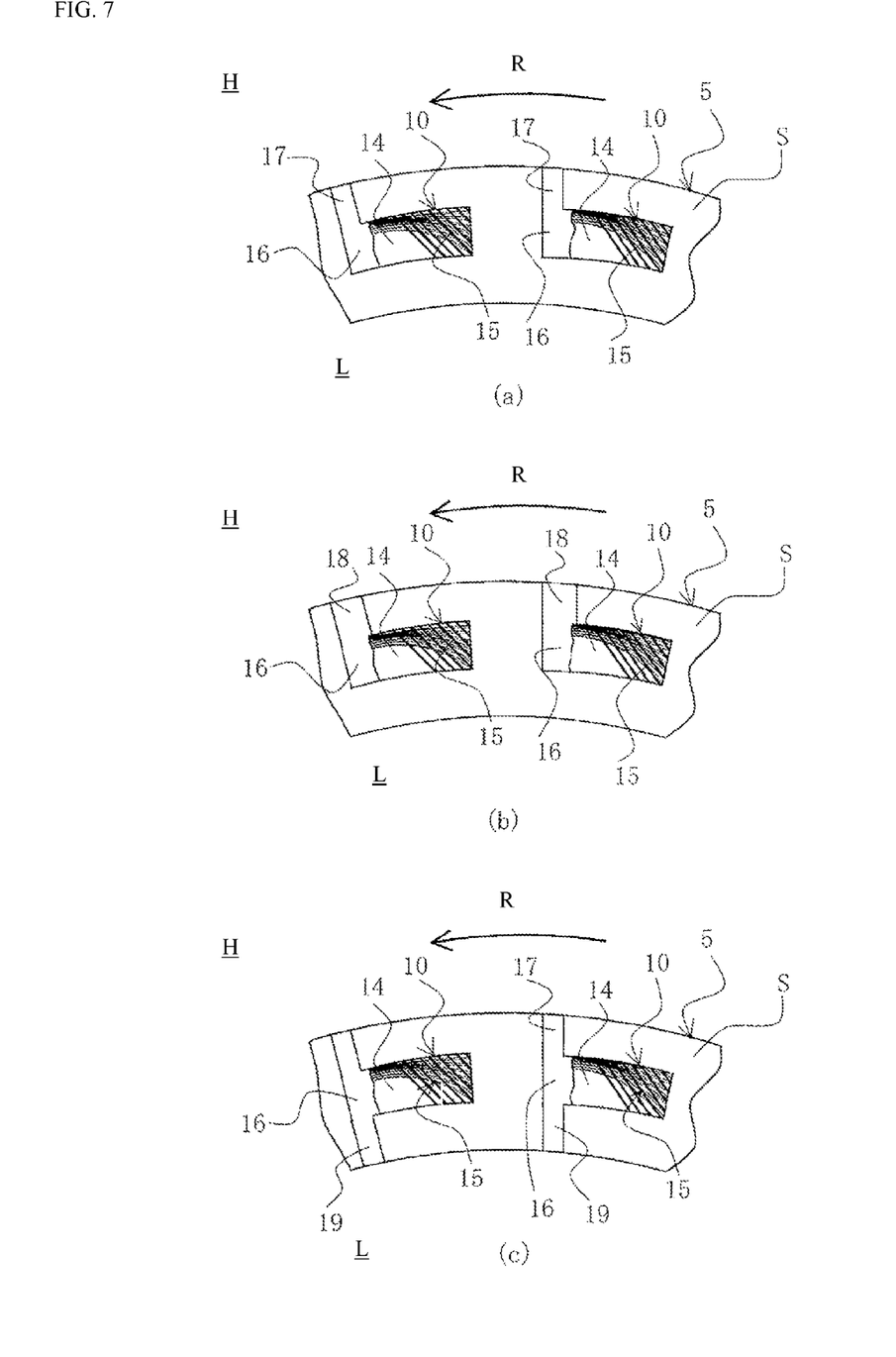
FIG. 7 is a plan view of key areas showing an example where continuous grooves that continue to the high-pressure fluid side, etc., are provided in a location other than the cavitation formation area in the dimple, as it pertains to Example 2 of the present invention.

FIG. 7 is a plan view of key areas showing an example where continuous grooves that continue to the high-pressure fluid side "H", etc., are provided in a location other than the cavitation formation area in the dimple, as it pertains to Example 2 of the present invention.

It should be noted that, in FIG. 7, the symbols corresponding to those used in Example 1 indicate the same members denoted by them in Example 1, and duplicate explanations are omitted.

In FIG. 7 (a), the cavitation formation area 14 is formed on the upstream side in the dimple 10, while hydrodynamic pressure generates and a positive pressure area 16 is formed in the other location or specifically on the downstream side. And, continuous grooves 17 that continue to the high-pressure fluid side "H" are provided in the positive pressure area 16. The continuous grooves 17 are as deep as or deeper than the concaved dimples 10. Also, the continuous grooves 17 are wide enough to release the positive pressure.

When the continuous grooves 17 that continue to the high-pressure fluid side "H" are provided in the positive pressure area 16 on the downstream side of the dimple 10, the positive pressure on the downstream side of the dimple 10 is released and thus the pressure on the upstream side decreases, and consequently cavitation occurs more easily on the upstream side. Accordingly, the cavitation formation area 14 extends to near the downstream side of the dimple 10 and the direction of the streak-like flow of fluid due to the cavitation formation area 14 can be controlled much better as a result. Also, fluid that has flowed into the positive pressure area 16 can be returned to the high-pressure fluid side "H".

In FIG. 7 (b), continuous grooves 18 that continue to the high-pressure fluid side "H" are provided in the positive pressure area 16. These continuous grooves 18 also continue to parts of the downstream side of the cavitation formation area 14 in addition to the positive pressure area 16. Accordingly, the positive pressure on the downstream side of the dimple 10 is released more and the direction of the streak-like flow of fluid due to the cavitation formation area 14 can be controlled much better as a result. Also, fluid that has flowed in and travelled to near the downstream side of the cavitation formation area 14 and fluid that has flowed into the positive pressure area 16 can be returned to the high-pressure fluid side "H".

In FIG. 7 (c), continuous grooves 17 that continue to the high-pressure fluid side "H" and continuous grooves 19 that continue to the low-pressure fluid side "L" are provided in the positive pressure area 16. Accordingly, the positive pressure on the downstream side of the dimple 10 is released to approach the pressure on the low-pressure side "L" and the direction of the streak-like flow of fluid due to the cavitation formation area 14 can be controlled much better as a result.

It should be noted that, while fluid that has flowed into the positive pressure area 16 is easily allowed to flow to the low-pressure fluid side "L", which seems not desirable as it may cause leakage when this example is applied to a seal device, this example can still be applied to sliding components in general including sliding bearings because some degree of leakage should be permitted in the case of bearings, etc., and their lubrication performance is expected to improve as a result of applying this example.

Example 3

Figure 8:
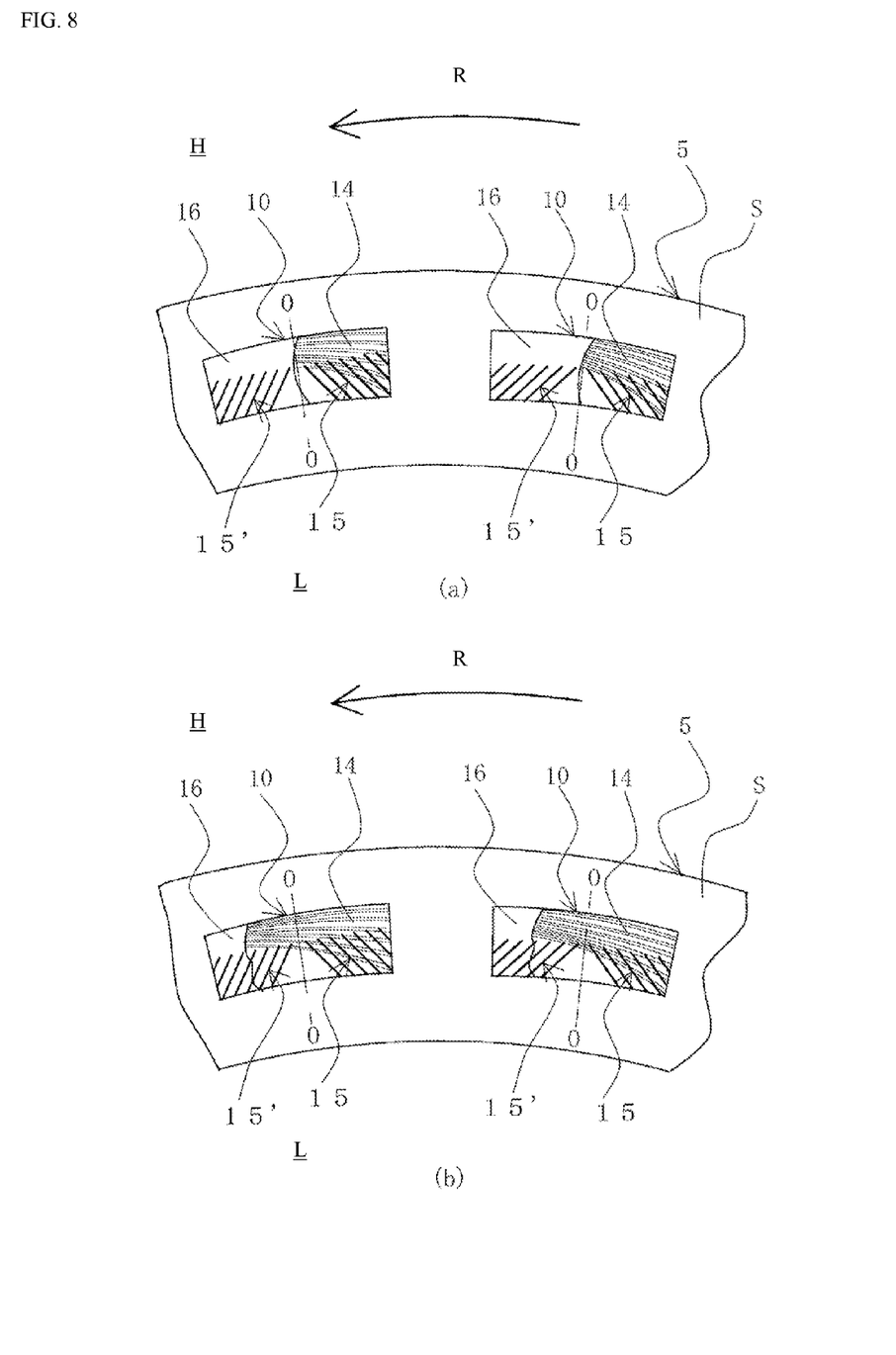
FIG. 8 is a plan view of key areas showing an example where stripe-shaped projections with directionality as provided in the cavitation formation area in the dimple are formed symmetrical with respect to the sliding direction of the sealing face, relative to the center of the dimple in the sliding direction, as it pertains to Example 3 of the present invention.

FIG. 8 is a plan view of key areas showing an example where stripe-shaped projections with directionality as provided in the cavitation formation area in the dimple are formed symmetrical with respect to the sliding direction of the sealing face, relative to the center of the dimple in the sliding direction, as it pertains to Example 3 of the present invention.

It should be noted that, in FIG. 8, the symbols corresponding to those used in Example 1 indicate the same members denoted by them in Example 1, and duplicate explanations are omitted.

While the sliding parts shown in Examples 1 and 2 can be applied only when they rotate in one direction, Example 3 can be applied when they rotate in two different directions.

In FIG. 8, stripe-shaped projections 15, 15' with directionality as provided in the cavitation formation area in the dimple 10 are formed in such a way that their directions become symmetrical with respect to the sliding direction of the sealing face over the radius line O-O passing through the center of the sliding direction of the dimple 10. In FIGS. 6 and 7, the cavitation formation area 14 is set in such a way that it extends over more than a half of the dimple 10 from its upstream side, but in FIG. 8(a), the cavitation formation area 14 is set in such a way that it extends only over approximately a half of the dimple 10 from its upstream side, and even when the rotating direction of the mating sealing face reverses to the clockwise direction, the cavitation formation area 14 still extends over approximately a half of the dimple 10 from its upstream side. For example, one way to do this is to increase the length of the dimple 10 in the circumferential direction or make the dimple 10 shallower so that the formed negative-pressure generation area becomes shorter in the circumferential direction. In addition, even if the formed cavitation formation area 14 extends to the downstream side of the radius line O-O as shown in FIG. 8(b), the streak-like flow of fluid remains controlled in the outer diameter direction on the upstream side and does not pass over the stripe-shaped projections 15' whose directionality is opposite that on the downstream side, and consequently the control of the streak-like flow of fluid is not affected and desired control can be implemented.

In the case of FIG. 8, the cavitation formation area 14 is formed over approximately a half of the dimple 10 from its upstream side, while the positive pressure area 16 is formed over approximately a half of it from its downstream side, so that the stripe-shaped projections 15 with directionality in the cavitation formation area 14 act upon the streak-like flow of fluid in a manner directing it to the high-pressure fluid side "H", while the stripe-shaped projections 15' with directionality in the positive pressure area 16 act upon the streak-like flow of fluid in a manner directing it to the low-pressure fluid side "L", which may lead to a tendency to leak. In the case of this example, however, fluid is controlled to travel to the high-pressure fluid side "H" in the cavitation formation area 14, and the amount of fluid that flows into the positive pressure area 16 is small and pressure does not increase, and therefore should some fluid travel to the low-pressure fluid side "L", it would be sealed by the sealing face S before reaching the low-pressure fluid side "L" and therefore leakage should not occur.

The foregoing explained the examples of the present invention using the drawings, but specific constitutions of the present invention are not limited to these examples and other changes and additions are also included in the scope of the present invention so long as they do not deviate from the key points of the present invention.

For example, while the aforementioned examples explained using the sliding parts as one of the pair of rotating seal ring and stationary seal ring in a mechanical seal device, it is also possible to use them as a sliding component for a bearing that slides against a rotating axis with lubrication oil sealed on one side of its cylindrical sealing face in the axial direction.

In addition, the aforementioned examples explained situations where high-pressure fluid is sealed on the outer periphery side, for example, but the present invention can also be applied when high-pressure fluid is present on the inner periphery side, in which case the stripe-shaped projections with directionality merely need to be provided in the opposite directions.

Furthermore, while the aforementioned examples primarily explained situations where the dimple has a quadrilateral shape, the shape of the dimple is not limited to a quadrilateral and it can also be circular, oval or polygonal.

REFERENCE SIGNS

1 Rotational axis
2 Sleeve
3 Rotating ring
4 Housing
5 Stationary ring
6 Coiled wave spring
7 Bellows
10 Dimple
11 Dimple
12 Narrowing gap (step)
13 Expanding gap (step)
14 Cavitation formation area
15 Stripe-shaped projections with directionality
16 Positive pressure area
17 Continuous groove
18 Continuous groove
19 Continuous groove

The invention claimed is:

1. A sliding component characterized in that dimples having a predetermined depth are provided on one sealing face of a pair of sliding parts that mutually slide relative to each other, and each dimple has stripe-shaped projections with directionality provided at a bottom of the dimple in a cavitation formation area in each dimple where cavitation occurs when the sliding parts mutually slide relative to each other, wherein top faces of the stripe-shaped projections are lower than the one sealing face and higher than the bottom of the dimple.

2. A sliding component according to claim 1, characterized in that the stripe-shaped projections with directionality are provided at least on a low-pressure fluid side of the cavitation formation area.

3. A sliding component according to claim 2, characterized in that continuous grooves that continue to a high-pressure fluid side are provided at least in a location other than the cavitation formation area in the dimple.

4. A sliding component according to claim 2, characterized in that the stripe-shaped projections with directionality provided in the cavitation formation area in the dimple are formed in such a way that their directions become symmetrical with respect to a sliding direction of the sealing face, relative to a center of the dimple in a sliding direction.

5. A sliding component according to claim 1, characterized in that continuous grooves that continue to a high-pressure fluid side are provided at least in a location other than the cavitation formation area in the dimple.

6. A sliding component according to claim 1, characterized in that the stripe-shaped projections with directionality provided in the cavitation formation area in the dimple are formed in such a way that their directions become symmetrical with respect to a sliding direction of the sealing face, relative to a center of the dimple in a sliding direction.

\* \* \* \* \*